Dec. 3, 1935.   H. J. MOORE ET AL   2,023,336
JACKING UNIT FOR AUTOMOBILES
Filed April 10, 1935   2 Sheets-Sheet 1
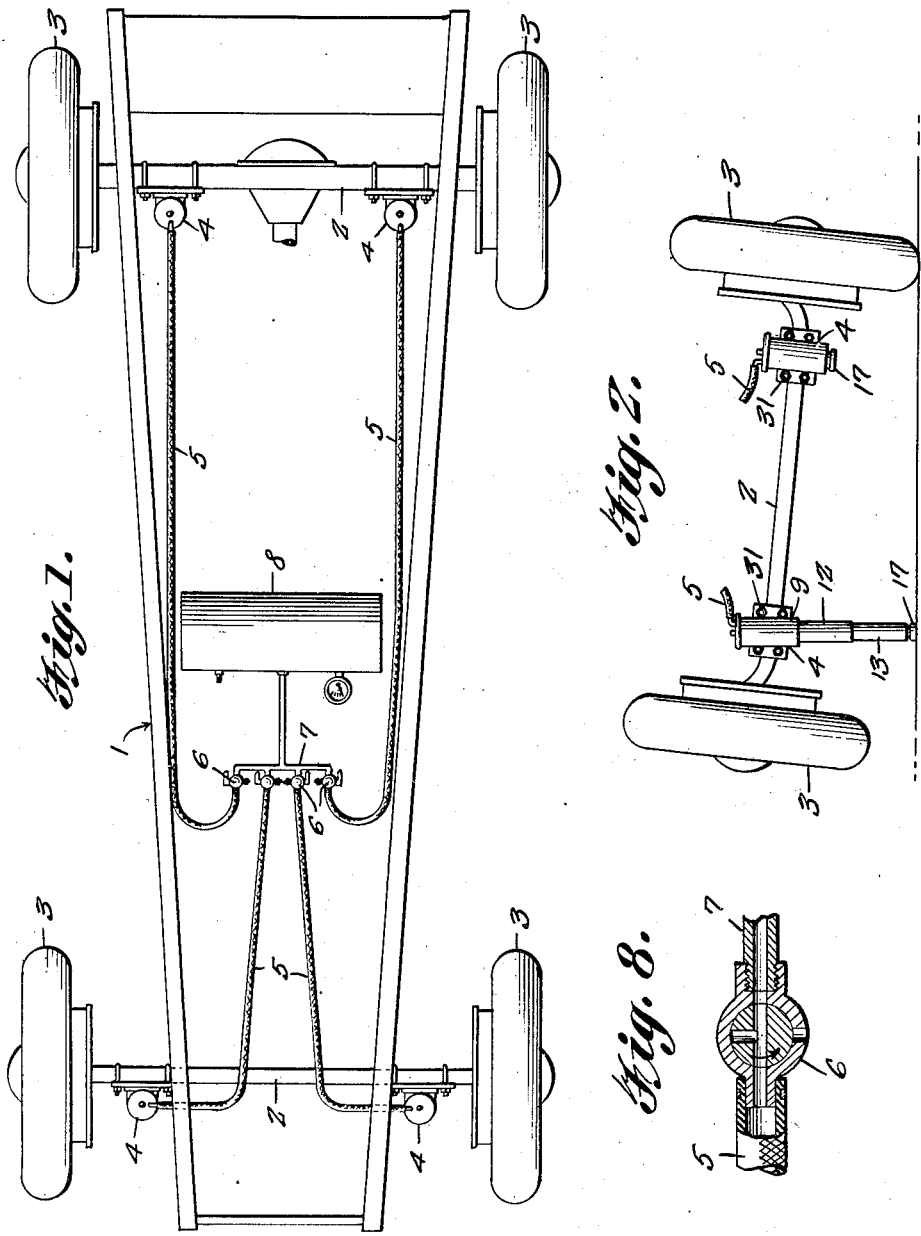
Harry J. Moore,
Daniel F. Pearson,
INVENTORS Dec. 3, 1935.  H. J. MOORE ET AL  2,023,336
JACKING UNIT FOR AUTOMOBILES
Filed April 10, 1935  2 Sheets-Sheet 2
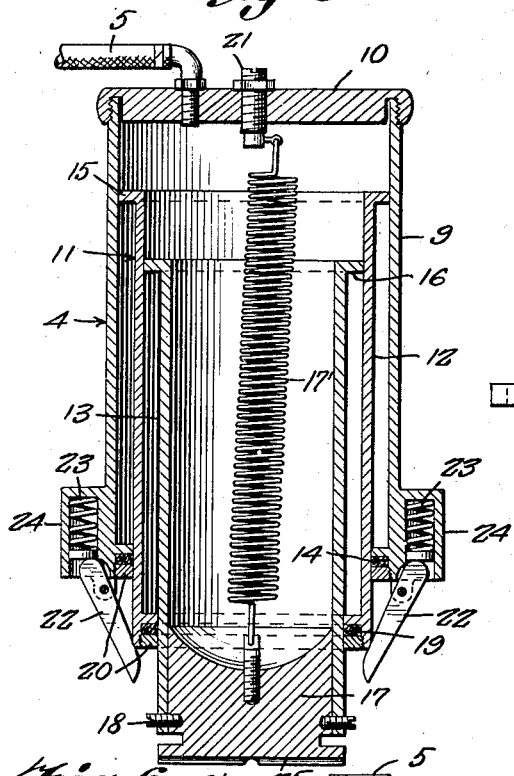
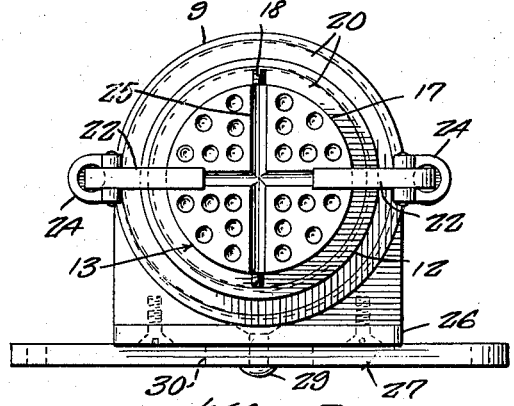
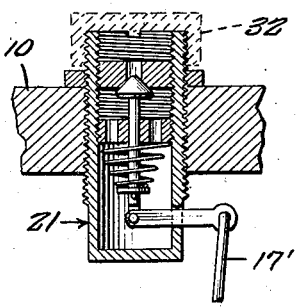
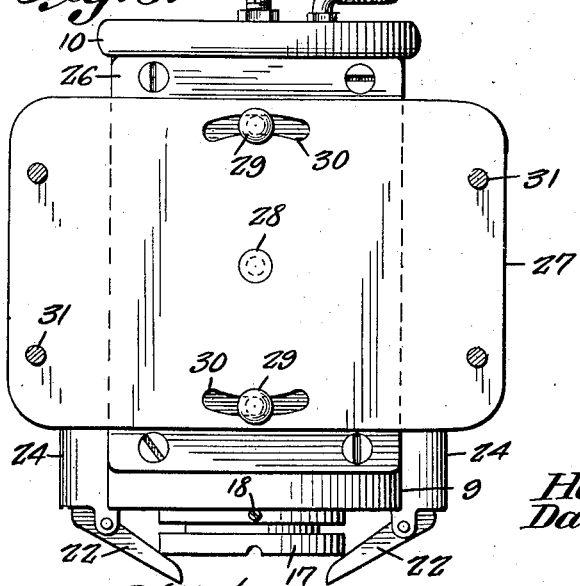
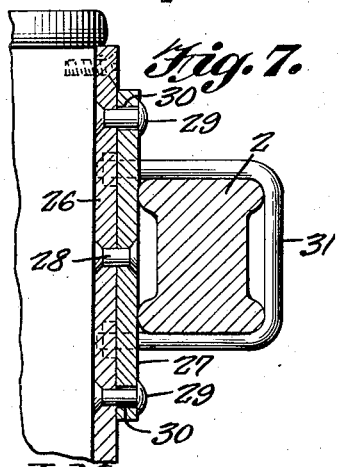
Harry J. Moore,
Daniel F. Pearson, INVENTORS
BY Victor J. Evans & Co.
ATTORNEY Patented Dec. 3, 1935

2,023,336

UNITED STATES PATENT OFFICE 2,023,336

JACKING UNIT FOR AUTOMOBILES

Harry J. Moore and Daniel F. Pearson, Pittsburgh, Pa., assignors of one-third to William Freyvogel, Pittsburgh, Pa.

Application April 10, 1935, Serial No. 15,706

3 Claims. (Cl. 254—86)

This invention relates to a motor vehicle hoisting mechanism, and has for the primary object the provision of a device of this character which may be readily adapted to a motor vehicle to form a part thereof and which may remain on the vehicle during the use or life of said vehicle and provides means whereby any one of the wheels of the vehicle may be elevated or lowered and is capable of elevating or lowering all wheels of the vehicle simultaneously, being controlled by the operator while seated within the vehicle.

With these and other objects in view, this invention consists in certain novel features of construction, combination and arrangement of parts to be hereinafter more fully described and claimed.

For a complete understanding of our invention, reference is to be had to the following description and accompanying drawings, in which Figure 1 is a plan view illustrating a motor vehicle chassis equipped with a hoisting mechanism constructed in accordance with our invention.

Figure 2 is an end elevation illustrating one of the wheels supported in elevated position by our invention.

Figure 3 is a vertical sectional view illustrating one of the jacks.

Figure 4 is an end view illustrating the same.

Figure 5 is a fragmentary vertical sectional view illustrating a safety valve for the jack.

Figure 6 is a side elevation, partly in section, showing a means for permitting the cylinder of the jack to have a limited pivotal movement with respect to the attaching bracket.

Figure 7 is a fragmentary sectional view showing means of securing the attaching bracket to the axle of the vehicle.

Figure 8 is a detail sectional view illustrating one of the control valves.

Referring in detail to the drawings, the numeral 1 indicates a motor vehicle chassis having front and rear axles 2 supported by wheels 3. This much of a motor vehicle is disclosed in Figure 1 for the purpose of illustrating the adaption of our invention to a motor vehicle. Detachably secured to the axles 2 adjacent the wheels 3 are hydraulic or pneumatically actuated jacks 4, each having connected thereto flexible pipes 5 and they are in turn connected to control valves 6. There is provided for each jack a control valve 6 and said control valves are connected to a manifold 7 and the latter is connected to a pressure tank 8 suitably mounted to the chassis. Air or fluid is compressed in the tank either by a compressor carried by the vehicle or by some other means foreign to the vehicle. The valves 6 are of the type capable of opening and closing the supply tank 8 to the jacks or for venting the jacks to the atmosphere. The valves are located on the vehicle in convenient reach of the operator whereby any one of the wheels may be raised or lowered, or if desired all wheels may be simultaneously raised and lowered.

The jacks referred to are all of the same construction and reference to one specifically is thought sufficient, the detail construction thereof being clearly disclosed in Figures 3 to 7 of the drawings.

The jack consists of a cylinder 9, the head 10 thereof having the pipe 5 connected thereto. Operating in the cylinder 9 is a jack element 11 consisting of telescopic sections 12 and 13. The open end of the cylinder is equipped with a packing gland 14 contacting the section 12 of the jack element and the latter section is equipped with a flange 15 cooperating with the packing gland in slidably supporting the section 12 in the cylinder. The inner end of the section 13 is open and provided with a flange 16 contacting the inner wall of the section 12 and the outer end of the section 13 is closed by a foot 17, the latter being removably secured to the section 13 by set screws 18 which project outwardly of the section 13 to contact a packing gland 19 of the section 12 during certain movements of the jack. The packing gland 19 establishes a leak proof connection between the sections 12 and 13 as well as an abutment for the set screws 18 to engage with during the collapsing of the jack element 11. The packing glands 14 and 19 each include a removable collar 20 so that the packing material can be adjusted or replaced when worn.

A coil spring 17' is detachably connected to the foot 17 and to the head 10 of the cylinder 9. The connection between the head 10 of the cylinder 9 and the spring is through a safety valve 21 which is of a self-opening type and the spring connected therewith will maintain said valve in a closed position to disrupt communication between the cylinder and the atmosphere. However, should the spring break or become disconnected, the valve 21 opens the cylinder to the atmosphere. Dogs 22 are pivoted to the open end of the cylinder 9 and are urged to extend across the open end of the cylinder by springs 23 mounted in castings 24 forming part of the cylinder 9. The jack element 11 when collapsed is underlaid by the dogs 22 so that they aid in holding the jack element in collapsed position.

The foot 17 is equipped with grooves 25 to receive the dogs. However, when force is applied to the jack element and within the cylinder 9, the dogs pivot against the action of the springs and permit the foot element to move into engagement with the ground. The foot 17 may be roughened or serrated, as suggested in Figure 4.

A wear plate 26 is secured to the cylinder 9 and has pivoted thereto an attaching plate 27, as shown at 28. Headed rivets 29 are carried by the wear plate 26 and extend through slots 20 in the attaching plate for permitting the attaching plate and wear plate to have a limited pivotal movement with respect to each other. A U-clamp 31 is employed for detachably securing the attaching plate to the axle. Due to the connection between the wear plate and the attaching plate, the cylinder 9 is capable of pivoting slightly on the axle so that the foot 17 when engaging with the ground may readily adjust itself to the surface of the ground to rest evenly thereon. Also during the elevation of the axle shown in Figure 2, the cylinder 9 may pivot relative to the axle to permit the foot to remain flat upon the ground.

Should any one of the springs 17' of the jacks break, the respective jack will be rendered inoperative due to the fact that the cylinder thereof will automatically open to the atmosphere by the valve 21. This will indicate to the operator that the jack is defective or inoperative. However, in order that the jack may be placed in use again temporarily, a cap 32 may be employed for closing the valve 21, as suggested in Figure 5.

Having described the invention, we claim:

1. A jacking device for motor vehicles comprising a cylinder, means for connecting the cylinder to a vehicle, means connecting said cylinder to a pressure supply, a telescopic jacking element operating in the cylinder and including sections, means establishing seals between said sections, a foot carried by one of the sections, spring means acting to normally retain the jacking element in a collapsed position, and spring pressed dogs pivoted to said cylinder for aiding in holding the jacking element in a collapsed position and adapted to release the jacking element when subjected to force within the cylinder.

2. A jack for motor vehicles comprising a cylinder, means for detachably connecting the cylinder to a vehicle, means for permitting said cylinder to have a limited pivotal movement with respect to the vehicle, a pressure actuated jacking element operating in the cylinder, means connecting said cylinder to a pressure supply, a spring connected to the jacking element, a self-opening safety valve carried by the cylinder and connected to the spring and held in closed position by said spring and the latter acting to retain the jacking element in an inoperative position.

3. A jack for motor vehicles comprising a cylinder, means for detachably connecting the cylinder to a vehicle, means for permitting said cylinder to have a limited pivotal movement with respect to the vehicle, a pressure actuated jacking element operating in the cylinder, means connecting said cylinder to a pressure supply, a spring connected to the jacking element, a self-opening safety valve carried by the cylinder and connected to the spring and held in closed position by said spring and the latter acting to retain the jacking element in an inoperative position, and spring-pressed dogs carried by said cylinder to engage with the jacking element for aiding the spring in maintaining the jacking element in an inoperative position.

HARRY J. MOORE.
DANIEL F. PEARSON.